United States Patent
Tiraspolsky

(10) Patent No.: US 10,565,248 B2
(45) Date of Patent: Feb. 18, 2020

(54) TIME-SHIFTED PLAYBACK FOR OVER-THE-TOP LINEAR STREAMING

(71) Applicant: Verizon Patent and Licensing Inc., Arlington, VA (US)

(72) Inventor: Alexander Tiraspolsky, Newton, MA (US)

(73) Assignee: Verizon Patent And Licensing Inc., Basking Ridge, NJ (US)

( * ) Notice: Subject to any disclaimer, the term of this patent is extended or adjusted under 35 U.S.C. 154(b) by 402 days.

(21) Appl. No.: 14/642,188

(22) Filed: Mar. 9, 2015

(65) Prior Publication Data
US 2016/0269457 A1 Sep. 15, 2016

(51) Int. Cl.
| G06F 16/44 | (2019.01) |
| G06F 21/10 | (2013.01) |
| H04L 29/06 | (2006.01) |
| G06F 16/438 | (2019.01) |

(52) U.S. Cl.
CPC .......... *G06F 16/44* (2019.01); *G06F 16/4387* (2019.01); *G06F 21/10* (2013.01); *H04L 65/1059* (2013.01); *H04L 65/4084* (2013.01); *H04L 65/605* (2013.01); *G06F 2221/0737* (2013.01)

(58) Field of Classification Search
CPC .......... H04L 63/0428; H04L 2463/101; H04L 63/0457; H04L 65/4084; H04L 2209/603; H04L 2209/60; H04N 21/2347; H04N 21/8456; H04N 21/4405; H04N 21/2541; H04N 21/4627; H04N 21/47202; H04N 21/4408; H04N 21/23439; H04N 21/4516

USPC ........................................................ 709/231
See application file for complete search history.

(56) References Cited

U.S. PATENT DOCUMENTS

| 8,413,256 B2 * | 4/2013 | Gonzalez | G06F 21/10 |
| | | | 726/27 |
| 2003/0139980 A1 * | 7/2003 | Hamilton | G06Q 30/0641 |
| | | | 705/27.1 |
| 2005/0183120 A1 * | 8/2005 | Jain | H04N 7/17336 |
| | | | 725/46 |

(Continued)

OTHER PUBLICATIONS

Wikipedia, "Over-the-top content", http://en.wikipedia.org/wiki/Over-the-top_content, Feb. 20, 2015, 2 pages.

*Primary Examiner* — William G Trost, IV
*Assistant Examiner* — Imran Moorad

(57) ABSTRACT

A device may receive multiple versions of content from one or more data streams associated with a content provider. The content may include audio content and/or video content. The one or more data streams may include digital rights management (DRM) protection. The device may cause the multiple versions of the content to be stored via a data structure. The data structure may be organized based on contextual information associated with the multiple versions of the content. The multiple versions of the content may be stored with the DRM protection. The device may receive a request for the content. The device may determine a particular version of the content, of the multiple versions of the content, based on the request for the content and at a determined location of the content. The device may provide the particular version of the content for playback of the audio content and/or the video content.

20 Claims, 10 Drawing Sheets

(56) References Cited

U.S. PATENT DOCUMENTS

| | | | |
|---|---|---|---|
| 2006/0041674 A1* | 2/2006 | Reme | H04L 29/06027 709/231 |
| 2006/0179154 A1* | 8/2006 | Sitaraman | H04L 43/00 709/231 |
| 2009/0219447 A1* | 9/2009 | Choi | G09G 5/006 348/725 |
| 2009/0328228 A1* | 12/2009 | Schnell | G06F 21/10 726/26 |
| 2010/0049989 A1* | 2/2010 | Lee | G06F 21/105 713/189 |
| 2011/0058675 A1* | 3/2011 | Brueck | H04N 21/2541 380/277 |
| 2011/0314502 A1* | 12/2011 | Levy | H04N 7/106 725/46 |
| 2012/0042332 A1* | 2/2012 | Wajs | H04L 9/088 725/31 |
| 2013/0067109 A1* | 3/2013 | Dong | H04L 65/4069 709/231 |
| 2013/0132986 A1* | 5/2013 | Mack | H04L 65/605 725/14 |
| 2013/0142499 A1* | 6/2013 | Major | H04N 21/234363 386/341 |
| 2013/0159421 A1* | 6/2013 | Yue | H04L 65/4084 709/204 |
| 2013/0174271 A1* | 7/2013 | Handal | G06F 17/30017 726/27 |
| 2013/0194996 A1* | 8/2013 | Oyman | H04W 72/0493 370/312 |
| 2013/0227158 A1* | 8/2013 | Miller | H04L 65/60 709/231 |
| 2013/0236158 A1* | 9/2013 | Lynch | H04N 5/91 386/231 |
| 2014/0230003 A1* | 8/2014 | Ma | H04N 21/231 725/115 |
| 2014/0344468 A1* | 11/2014 | Saremi | H04L 65/105 709/231 |
| 2016/0205165 A1* | 7/2016 | Casalena | H04L 65/80 709/219 |

* cited by examiner

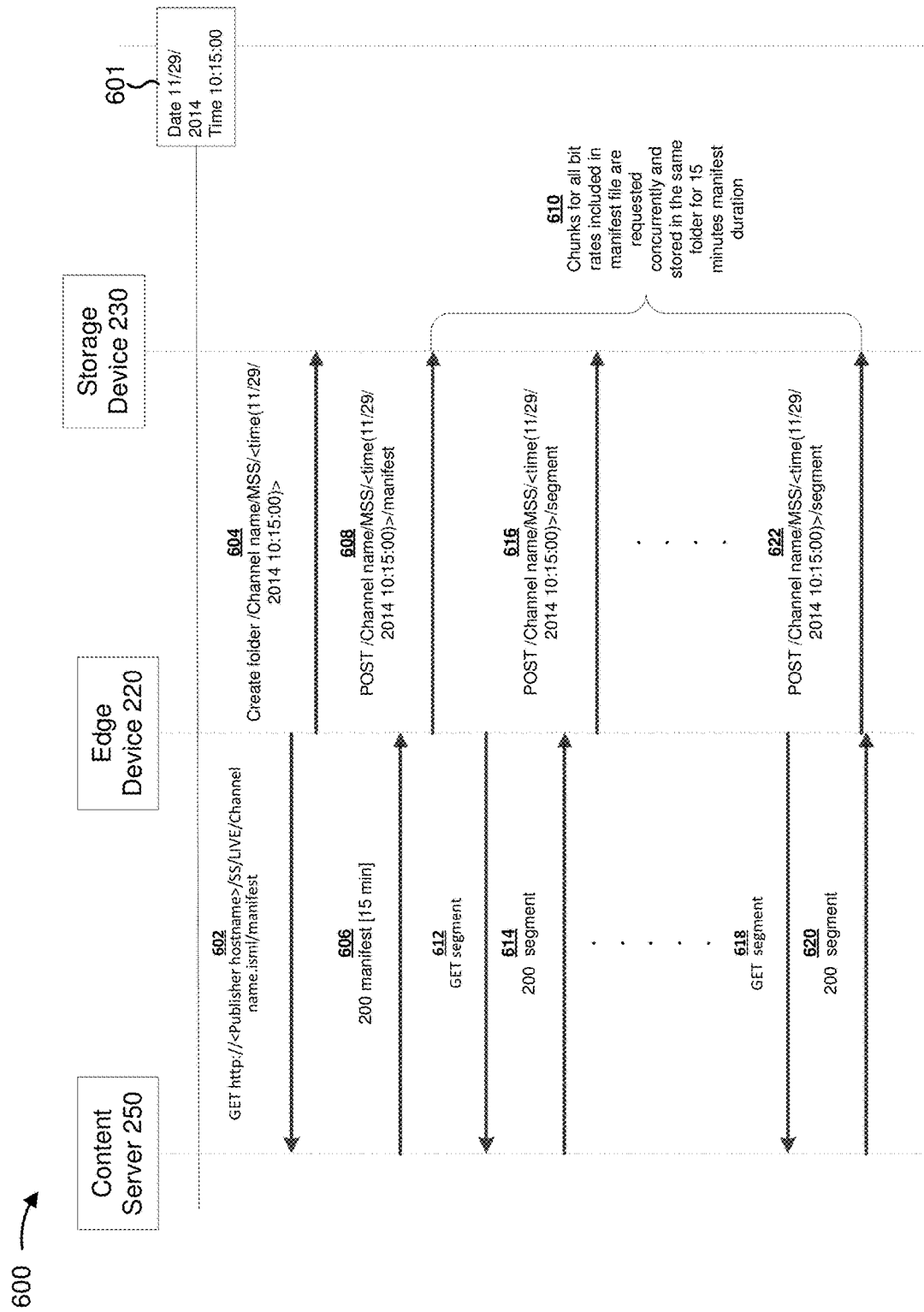

TIME-SHIFTED PLAYBACK FOR OVER-THE-TOP LINEAR STREAMING

BACKGROUND

Over-the-top (OTT) linear streaming may refer to delivery of media content to a user using a broadband connection, such as an Internet connection. For example, a content server may provide television content to a user device, via an Internet stream, for playback with a playback application. A content delivery network may include multiple, distributed devices for delivering an OTT linear stream from a content server associated with a content provider to a user device.

BRIEF DESCRIPTION OF THE DRAWINGS

FIGS. 6A and 6B are call flow diagrams relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A content provider may provide an over-the-top (OTT) linear streamed content (e.g., a television program, a movie, a radio show, or the like) from a content server to a user device via a content delivery network (CDN). The content server may provide the streamed content in multiple versions, such as in one or more encoding formats, at one or more bit rates, using one or more digital rights management (DRM) protection schemes, or the like. A user device, utilizing a playback application associated with the content provider, may receive a particular version (e.g., a particular format, a particular bit rate, a particular DRM protection scheme, etc.) of the OTT linear streamed content from the content server via the CDN. The user device may include a time-shifting module (e.g., a digital video recorder (DVR)) that records the OTT linear streamed content in the particular format, at the particular bit rate, and without the particular DRM protection scheme.

However, a user may desire to select from multiple versions of the OTT linear streamed content at the time of playback, instead of at the time of broadcast. Moreover, the content provider may desire that time-shifted copies of the OTT linear streamed content maintain DRM protection during storage until playback is performed at the user device. Implementations, described herein, may utilize an edge device in the content delivery network (CDN) to store and provide time-shifting for OTT linear streamed content. In this way, time-shifting pseudo-DVR service may be provided, by an operator of a CDN and to a user, based on the OTT linear streamed content in multiple versions without the content provider establishing an on-demand streaming system.

Figure 1:
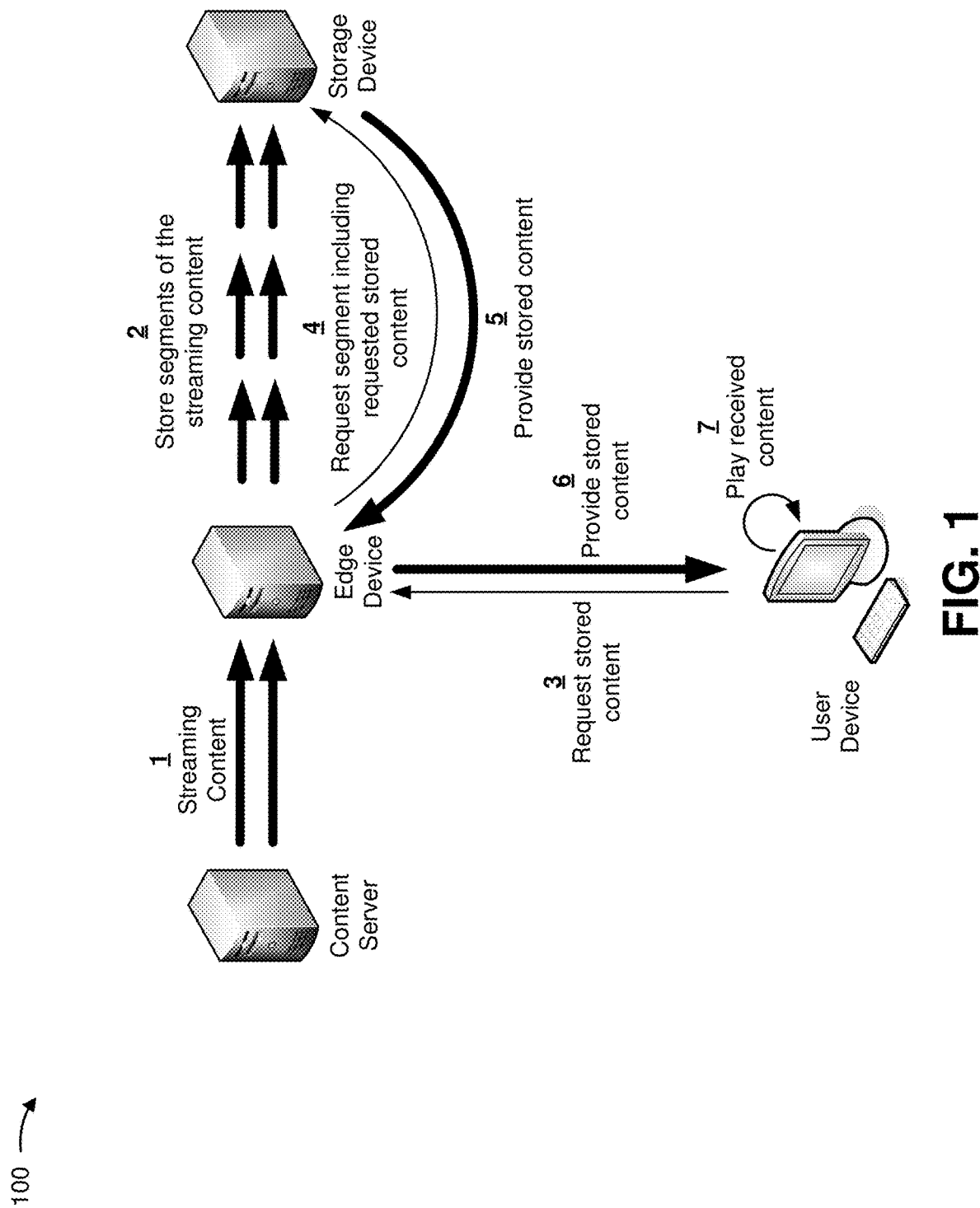
FIG. 1 is a diagram of an overview of an example implementation described herein.

FIG. 1 is a diagram of an overview of an example implementation 100 described herein. As shown in FIG. 1, and by reference indicator 1, a content server may provide streaming content to an edge device (e.g., a CDN edge server). For example, the content server may provide a first version of television content, via an Internet connection, at a first resolution and a second version of the television content at a second resolution. As shown by reference indicator 2, the edge device may cause segments of the streaming content to be stored as stored content via a data structure of a storage device. For example, the edge device may store segments of the streaming content via a data structure without removing DRM protection associated with the streaming content. The edge device may provide information to a user device identifying streaming content that may be requested, contextual information associated with the streaming content (e.g., time intervals at which particular media content may be viewed, resolutions at which the particular media content may be provided, formats in which the particular media content may be provided, etc.), or the like.

As further shown in FIG. 1, and by reference indicator 3, the edge device may receive a request for stored content to be provided. For example, the user device may provide a request, to the edge device, for the particular media content at a particular time-stamp with a particular resolution. As shown by reference indicator 4, the edge device may identify and request a segment of stored content that matches the request. For example, the edge device may identify a folder of the data structure of the storage device that includes a data file for the particular media content with the particular resolution at a time interval that includes the particular time-stamp. As shown by reference indicator 5, the edge device may receive the segment of stored content that matches the request (e.g., the particular media program) and, as shown by reference indicator 6, the edge device may provide the segment of stored content to the user device. As shown by reference indicator 7, based on receiving the segment of stored content, the user device may play the segment of stored content. For example, the user device may remove DRM protection associated with the television content and provide the television content for display. In this case, the user device may remove the DRM without interaction with the edge device similar to when the user device receives an OTT linear stream in real-time without the edge device as an intermediary.

In this way, an edge device may facilitate time-shifting of an OTT linear stream for a user device and maintain multiple versions of the OTT linear stream (e.g., multiple bit rates, multiple formats, etc.) and DRM protection on the OTT linear stream.

Figure 2:
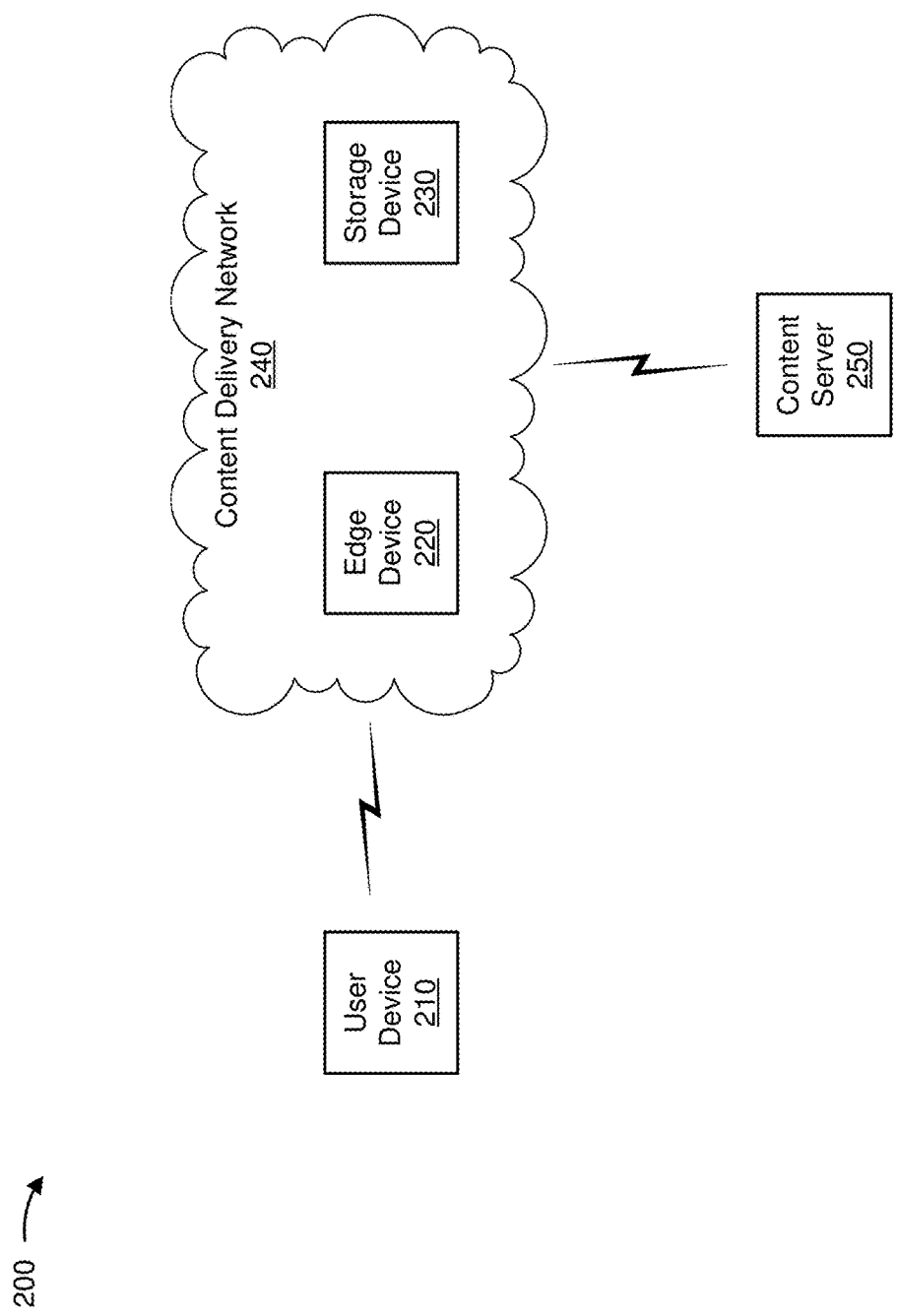
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an edge device 220, a storage device 230, a content delivery network (CDN) 240, and a content server 250. Devices of environment 200 may interconnect via wired connections, wireless connections, or a combination of wired and wireless connections.

User device 210 may include one or more devices capable of receiving, generating, storing, processing, and/or providing information associated with playback of media content. For example, user device 210 may include a content playback device, such as a mobile phone (e.g., a smart phone, a radiotelephone, etc.), a computer (e.g., a laptop computer, a tablet computer, a handheld computer, a desktop computer, etc.), a gaming device, a wearable communication device (e.g., a smart wristwatch, a pair of smart eyeglasses, etc.), or a similar type of device. In some implementations, user device 210 may include a user interface for requesting particular content from edge device 220 and playing the particular content when received from edge device 220. In some implementations, user device 210 may receive information from and/or transmit information to another device in environment 200.

Edge device 220 may include one or more devices capable of receiving, generating, storing, processing, and/or providing information associated with playback of content. For example, edge device 220 may include a server, such as a CDN edge device (e.g., a CDN edge server), that receives multiple OTT linear streams, and categorizes the multiple OTT linear streams for storage. In some implementations, multiple edge devices 220 may be associated with storage device 230 and/or CDN 240. In some implementations, edge device 220 may receive information from and/or transmit information to another device in environment 200.

Storage device 230 may include one or more devices capable of receiving, generating, storing, processing, and/or providing information associated with playback of media content. For example, storage device 230 may include a server, a cloud storage device, or the like, that includes a data structure for storing media content and may provide requested media content to edge device 220. In some implementations, storage device 230 may receive media content from multiple edge devices 220 for storage and/or receive requests from multiple edge devices 220 for stored media content. In some implementations, storage device 230 may receive information from and/or transmit information to another device in environment 200.

CDN 240 may include one or more wired and/or wireless networks. For example, CDN 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Content server 250 may include one or more devices capable of storing, processing, and/or routing information. For example, content server 250 may include a streaming media server associated with a content provider, such as a television network, a radio network, or the like. In some implementations, content server 250 may provide media content in multiple versions (e.g., particular content provided at multiple bit rates, in multiple formats, etc.). In some implementations, content server 250 may provide a particular content in multiple segments. Each segment may include a subset of the particular content. For example, content server 250 may provide, to edge device 220, a first portion of the particular content associated with a first time interval, a second portion of the particular content associated with a second time interval, or the like. In some implementations, content server 250 may include a communication interface that allows content server 250 to receive information from and/or transmit information to other devices in environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
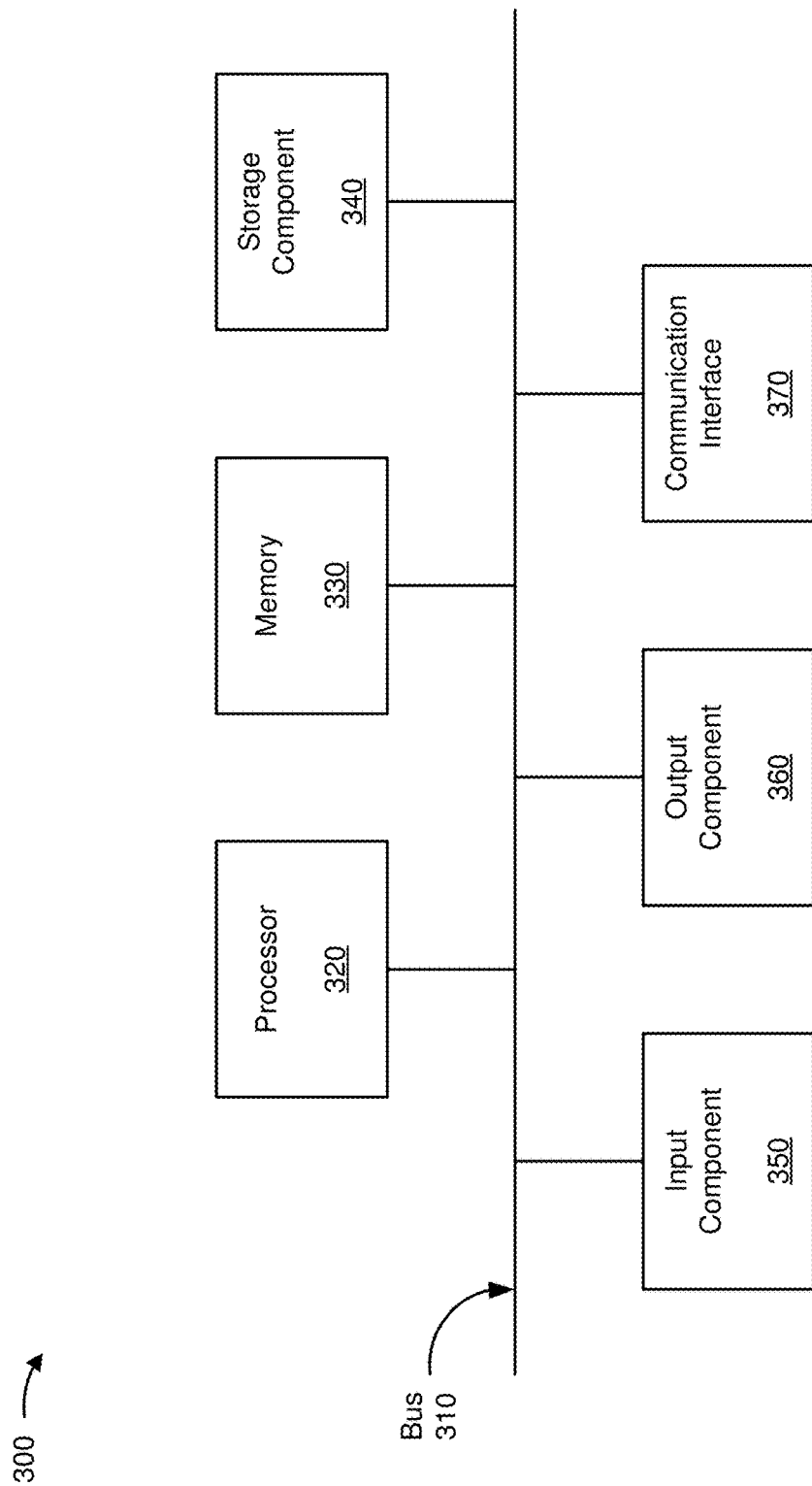
FIG. 3 is a diagram of example components of one or more devices of FIG. 2.

FIG. 3 is a diagram of example components of a device 300. Device 300 may correspond to user device 210, edge device 220, storage device 230, and/or content server 250. In some implementations, user device 210, edge device 220, storage device 230, and/or content server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
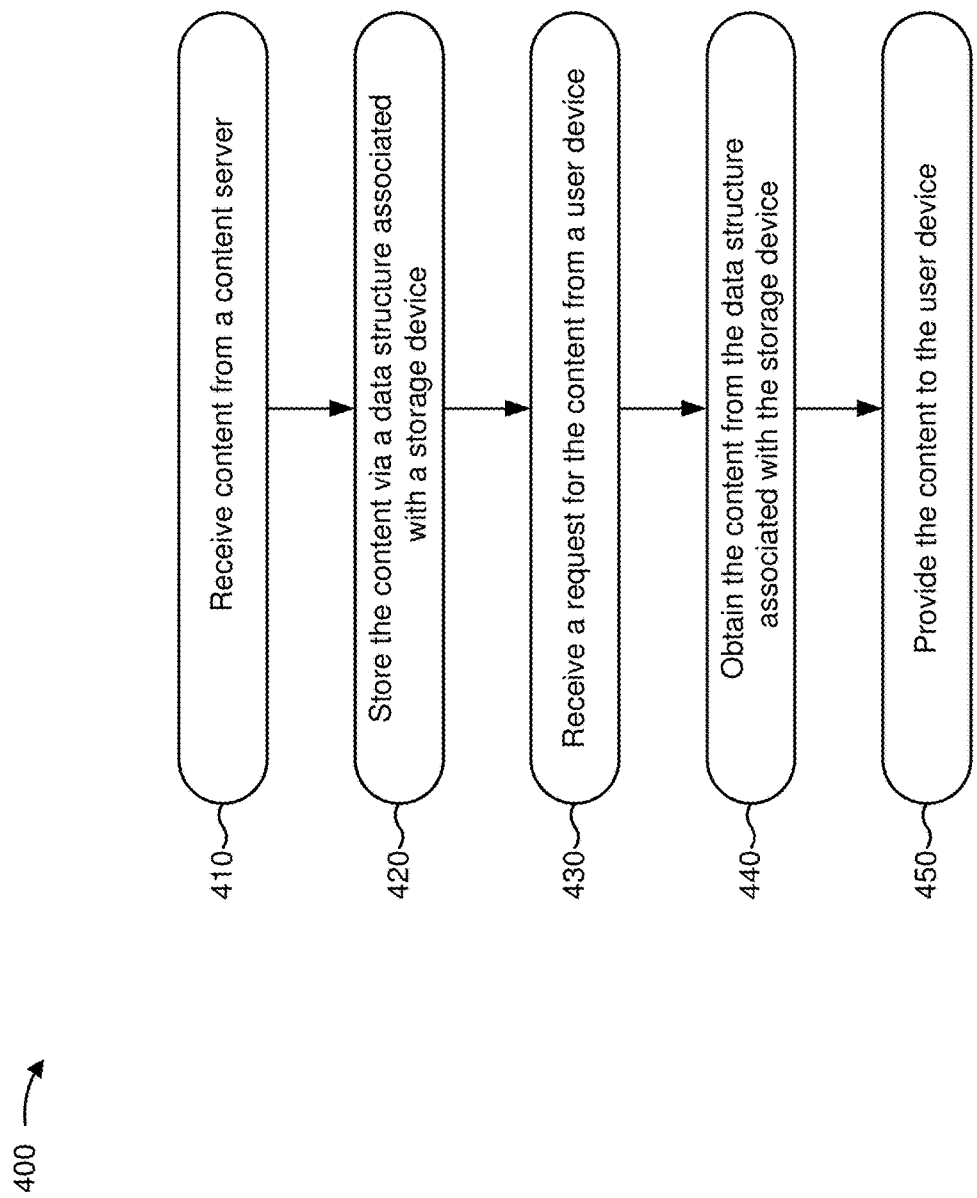
FIG. 4 is a flow chart of an example process for providing time-shifting for over-the-top linear streamed content.

FIG. 4 is a flow chart of an example process 400 for providing time-shifting for over-the-top linear streamed content. In some implementations, one or more process blocks of FIG. 4 may be performed by edge device 220. Additionally, or alternatively, one or more process blocks of FIG. 4 may be performed by another device or a set of devices separate from or including edge device 220, such as user device 210, storage device 230, and/or content server 250.

As shown in FIG. 4, process 400 may include receiving content from a content server (block 410). For example, edge device 220 may receive content from content server 250. Content may include media content, such as audio content, video content, audio-video content, or the like. For example, edge device 220 may receive content (e.g., a set of television programs) being streamed by content server 250. In some implementations, edge device 220 may receive the content from content server 250 based on requesting the content. For example, edge device 220 may transmit a request for authorization to receive the content, and may be approved to receive the content by content server 250. Additionally, or alternatively, edge device 220 may receive the content based on accessing a data stream of the content. For example, edge device 220 may receive the content via a linear OTT stream. In this case, edge device 220 may utilize stored information identifying the data stream, may receive information identifying the data stream, or the like. In some implementations, edge device 220 may receive the content based on a request from a user. For example, a user of user device 210 may request, via user device 210, that edge device 220 receive the content.

Edge device 220 may receive content from multiple content servers 250, in some implementations. For example, a first content server 250 associated with a content source (e.g., a first television channel) may provide first content via a first OTT linear stream and a second content server 250 associated with a second television channel may provide second content via a second OTT linear stream. In some implementations, a particular content server 250 may provide multiple types of content (e.g., multiple television programs, multiple movies, multiple radio shows, a combination of one or more television programs and one or more radio shows, etc.). For example, content server 250 may provide, to edge device 220, first content followed by second content. Additionally, or alternatively, content server 250 may provide the first content concurrently with the second content. In some implementations, particular content may be provided in multiple portions. For example, content server 250 may provide, to edge device 220, a first portion of the particular content associated with a first time interval (e.g., a particular quantity of minutes of the program) followed by a second portion of the particular content associated with a second time interval. In this case, content server 250 may utilize a playlist, a manifest file, or the like to schedule multiple portions of the content, multiple portions of multiple content items (e.g., multiple television programs), or the like.

Edge device 220 may receive multiple versions of the content, in some implementations. For example, content server 250 may provide, and edge device 220 may receive, a first version of the content and a second version of the content. A version may refer to the content being differentiated in one or more aspects. For example, the content may be differentiated based on bit rate (e.g., a 10 Megabyte per minute (MB/min) bit rate, a 20 MB/min bit rate, a 35 MB/min bit rate, etc.), encoding format (e.g., HTTP Live Streaming (HLS) encoding, Microsoft Smooth Streaming (MSS) encoding, etc.), DRM encryption scheme (e.g., Protected Streaming DRM, FairPlay DRM, etc.), or the like. For example, a first version may utilize a 1200 kilobits per second (Kbps) bitrate, HLS encoding, and FairPlay DRM and a second version may utilize a 1500 Kbps bitrate, MSS encoding, and FairPlay DRM.

In some implementations, edge device 220 may receive the content based on pulling the content from content server 250. For example, edge device 220 may emulate one or more player applications to cause content server 250 to provide the content. In this case, edge device 220 may emulate multiple player applications associated with multiple bit rates, file formats, or the like.

As further shown in FIG. 4, process 400 may include storing the content via a data structure associated with a storage device (block 420). For example, edge device 220 may store the content via the data structure associated with storage device 230 in a particular location (e.g., a storage location within an organized data structure) determined based on contextual information associated with the content (e.g., a time interval, a time-stamp, a channel, a streaming protocol, a DRM protection, or the like). In some implementations, edge device 220 may utilize a particular organization for the data structure (e.g., the data structure is organized by edge device 220 based on contextual information associated with the content). For example, edge device 220 may cause a data file associated with the content to be stored in a hierarchical data structure that organizes information based on the contextual information. Further to the example, edge device 220 may cause hierarchical folders to be established in the data structure that categorize available content based on a channel of the content, a title of the content, a time interval associated with the content, a resolution associated with the content, a bit rate associated with the content, or the like. In this case, edge device 220 may maintain information associated with identifying available content stored via the data structure, locating content stored via the data structure, or the like.

In some implementations, edge device 220 may store the content for a particular period of time. For example, edge device 220 may store the content until a particular date, until a threshold quantity of storage space is utilized, or the like. Additionally, or alternatively, edge device 220 may monitor the data structure to determine when to remove content from the data structure when a particular quantity of time has elapsed. For example, edge device 220 may determine that the content has been stored for a threshold quantity of time, a particular period of time, or the like and may cause storage device 230 to remove the content from the data structure.

As further shown in FIG. 4, process 400 may include receiving a request for the content from a user device (block 430). For example, edge device 220 may receive the request for the content from user device 210. In some implementations, edge device 220 may receive information associated with locating the content. For example, a user may provide, via a user interface of user device 210, contextual information associated with the content, such as information identifying the title of the content, a time interval associated with the content, a time-stamp associated with the content (e.g., a time-stamp at which playback is to commence), a requested resolution for the content, or the like, to edge device 220. In some implementations, edge device 220 may determine information associated with the content based on the request. For example, edge device 220 may receive, from user device 210, a request for particular content at a best available resolution, and edge device 220 may determine a set of available resolutions for the particular content, and select a particular resolution from the set based on the set of available resolutions, based on a quality of a network connection with user device 210, or the like. In some implementations, edge device 220 may authenticate the user when receiving the request from user device 210. For example, edge device 220 may determine that the user is authorized to receive the content based on a subscription level, a geographic region, or the like.

As further shown in FIG. 4, process 400 may include obtaining the content from the data structure associated with the storage device (block 440). For example, edge device 220 may obtain the content from the data structure associated with storage device 230. In some implementations, edge device 220 may locate the content in the data structure. For example, based on information associated with the request (e.g., a title, a time interval, a resolution, etc.), edge device 220 may locate a folder that is associated with storing a data file corresponding to the request (e.g., a folder corresponding to the title that includes a sub-folder corresponding to the time interval, that includes a data file corresponding to the content at the resolution, etc.). In some implementations, edge device 220 may request the content from storage device 230. For example, edge device 220 may request that storage device 230 provide the content. Additionally, or alternatively, edge device 220 may obtain the content from a data structure associated with edge device 220 (rather than from a data structure associated with storage device 230). In some implementations, edge device 220 may store the content in a buffer. For example, edge device 220 may store the content in a buffer associated with edge device 220, and subsequently provide the content to user device 210.

In some implementations, edge device 220 may locate the content at a particular time interval. For example, when a user requests content at a particular time-stamp, edge device 220 may determine a time interval that includes the time-stamp and obtain the data file corresponding to the time interval. In some implementations, edge device 220 may obtain a set of data files corresponding to the content. For example, when requested content is stored as segments (e.g., a set of data files corresponding to a set of time intervals), edge device 220 may obtain the set of data files and generate a playlist (e.g., a manifest file) of the set of data files to provide the requested content.

As further shown in FIG. 4, process 400 may include providing the content to the user device (block 450). For example, edge device 220 may provide the content to user device 210 for playback. In some implementations, edge device 220 may provide a particular time interval of the content. For example, when a user requests content at a particular time-stamp, edge device 220 may provide content associated with a time interval that includes the time-stamp. In some implementations, edge device 220 may determine a time interval for the content. For example, when a particular time-stamp for the content is indicated, edge device 220 may select a time interval starting a first quantity of time before the time-stamp and a second quantity of time after the time-stamp, which may include multiple data files associated with time intervals, portions of multiple data files, portions of a single data file, or the like. Additionally, or alternatively, edge device 220 may provide the content in a playlist. For example, when the user requests content that is stored via multiple data files associated with multiple time intervals, edge device 220 may provide the content via a set of data files that correspond to the multiple time intervals.

In some implementations, edge device 220 may cause DRM protection to be removed from the content when providing the content to the user. For example, edge device 220 may authorize the user to play the content, and may remove DRM protection from the content. Additionally, or alternatively, the DRM protection may be removed from the content by user device 210 based on DRM credentials associated with user device 210 and/or a user thereof. In some implementations, edge device 220 may decode the content into another content format. For example, when edge device 220 provides the content and the content is encoded in a first encoding format, edge device 220 may convert the content into a second encoding format. Additionally, or alternatively, edge device 220 may cause the content to be decoded by user device 210. For example, when edge device 220 provides the content in a particular encoding format associated with a player application of user device 210, user device 210 may decode the content via the player application.

Edge device 220 may alter the version of the content being provided to user device 210 when providing the content, in some implementations. For example, edge device 220 may provide the content at a first resolution based on a bandwidth associated with a connection to user device 210, may determine that the bandwidth is increased, and may provide the content at a second, higher resolution based on determining that the bandwidth is increased. In some implementations, edge device 220 may receive an instruction to provide the content at the second, higher resolution. For example, user device 210 may determine that the bandwidth is increased and may request the content at the second, higher resolution.

Edge device 220 may provide the content in real time, near real time (which includes real time or substantially real time) (e.g., relative to edge device 220 receiving the content from content server 250), or the like, in some implementations. For example, when edge device 220 receives a request for content being received from content server 250, edge device 220 may provide the content that is being received from content server 250 in near real time to user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of providing time-shifting for over-the-top linear streamed content.

Figure 5A:
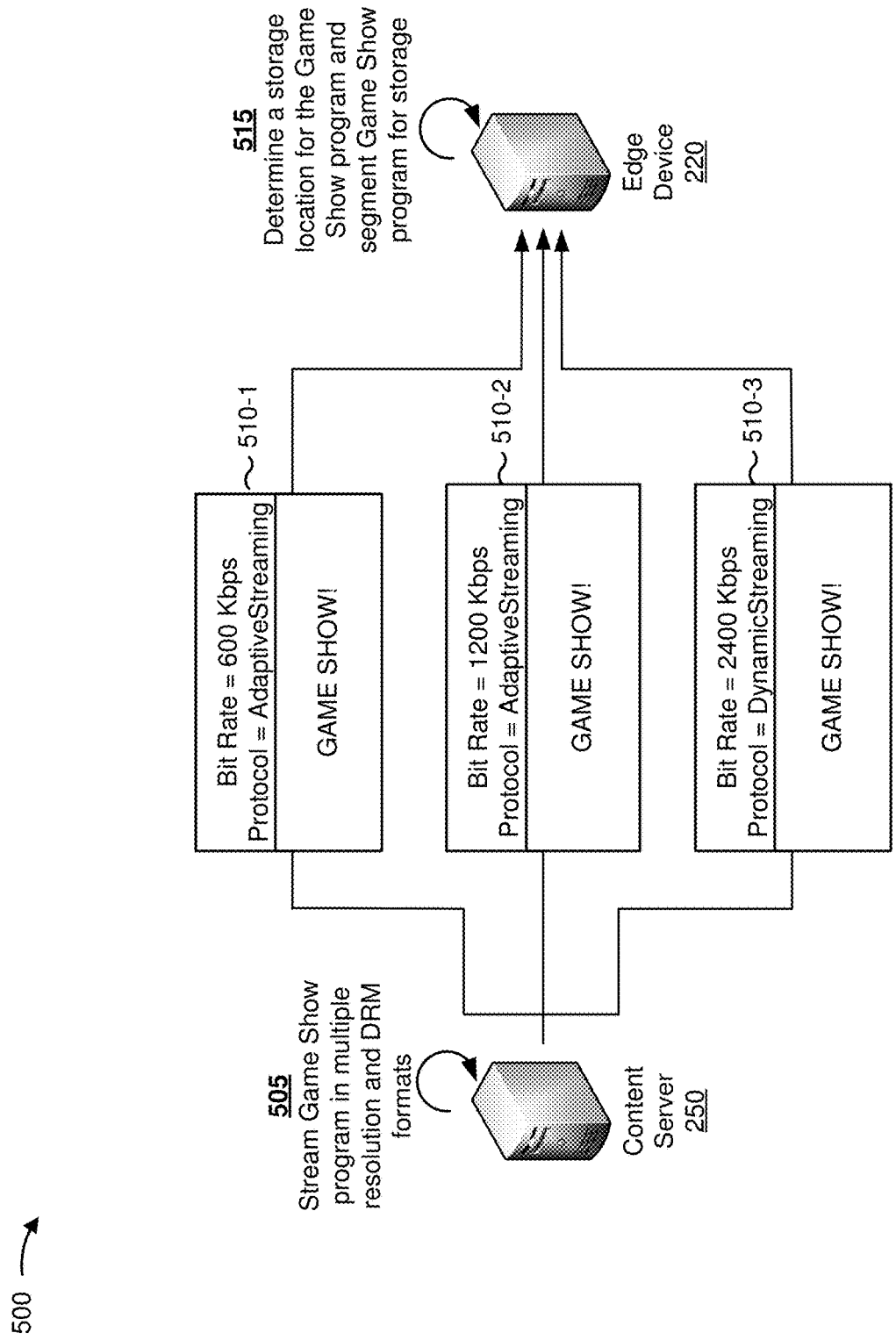
FIGS. 5A-5D are diagrams of an example implementation relating to the example process shown in FIG. 4.

As shown in FIG. 5A, and by reference number 505, content server 250 streams multiple versions of game show content (e.g., "GAME SHOW!"). For example, version 510-1 is associated with a 600 Kbps bit rate and an "AdaptiveStreaming" streaming protocol (e.g., a particular streaming format associated with a particular DRM format). Version 510-2 is associated with a 1200 Kbps bit rate and an "AdaptiveStreaming" streaming protocol. Version 510-3 is associated with a 2400 Kbps bit rate and a "DynamicStreaming" streaming protocol. As shown by reference number 515, edge device 220 receives each version, determines a storage location for each version based on the bitrate and DRM format, and segments the versions for storage (e.g., segments each version into a set of data files corresponding to a set of time intervals).

Figure 5B:
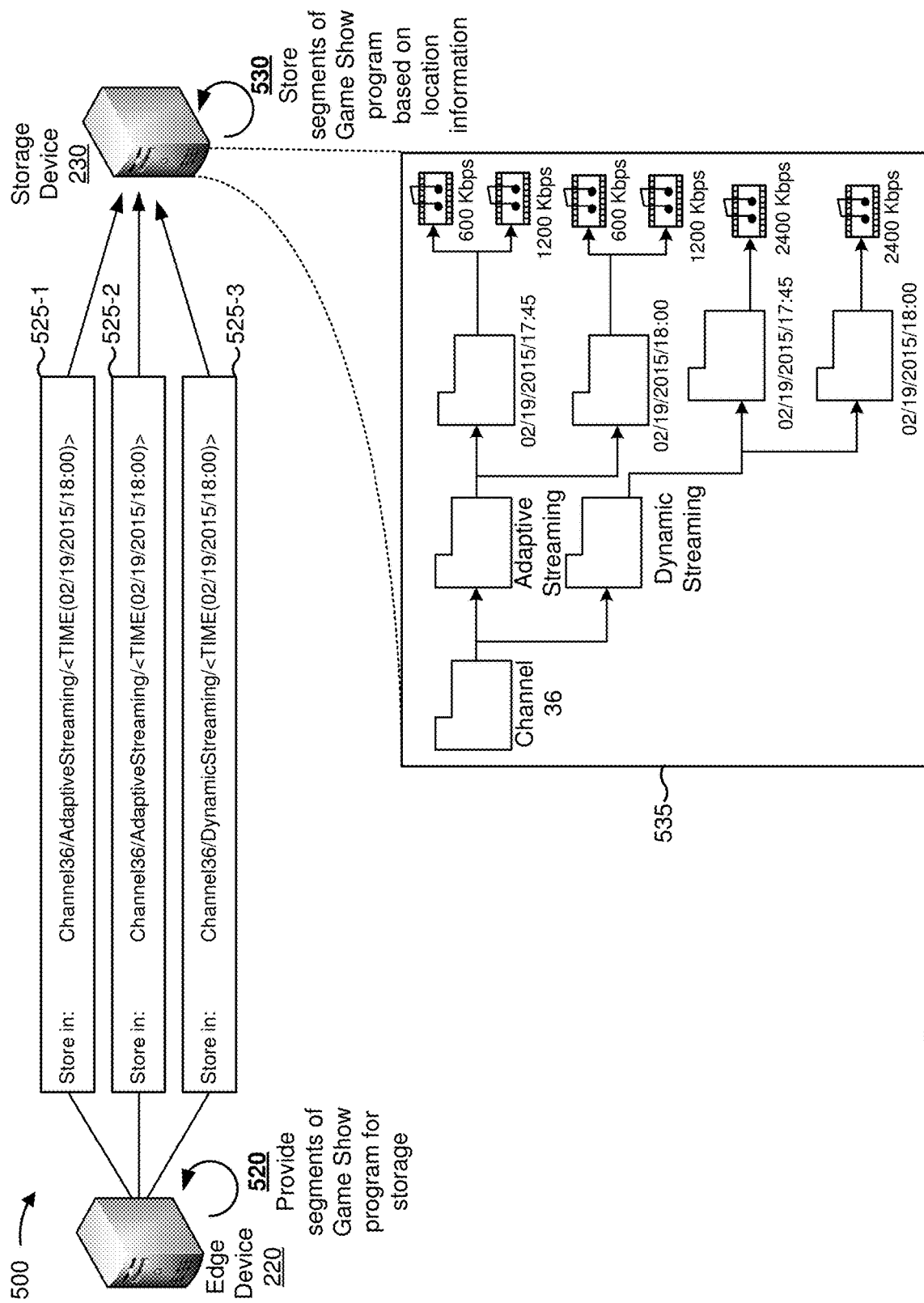

As shown in FIG. 5B, and by reference number 520, edge device 220 provides segments of the game show content to storage device 230 for storage. Each segment includes information indicating a location within a data structure of storage device 230 where the segment is to be stored. For example, segment 525-1, which corresponds to version 510-1, includes information identifying a folder location for storing segment 525-1; based on the information, segment 525-1 is to be stored in a folder associated with a particular channel (e.g., "Channel36"), in a sub-folder associated with a particular streaming protocol (e.g., "AdaptiveStreaming"), in a sub-sub-folder associated with a time interval starting at a particular time (e.g., "<TIME(02/19/2015/18:00)>"). Similarly, segment 525-2 and segment 525-3, corresponding respectively to version 510-2 and version 510-3, are to be stored in respective folders based on information identifying folder locations. As shown by reference number 530, storage device 230 stores the segments of the game show content in a location of a data structure based on the information. As shown by reference number 535, the data structure associated with storage device 230 may be conceptually represented as a set of folders in which the segments are stored.

Figure 5C:
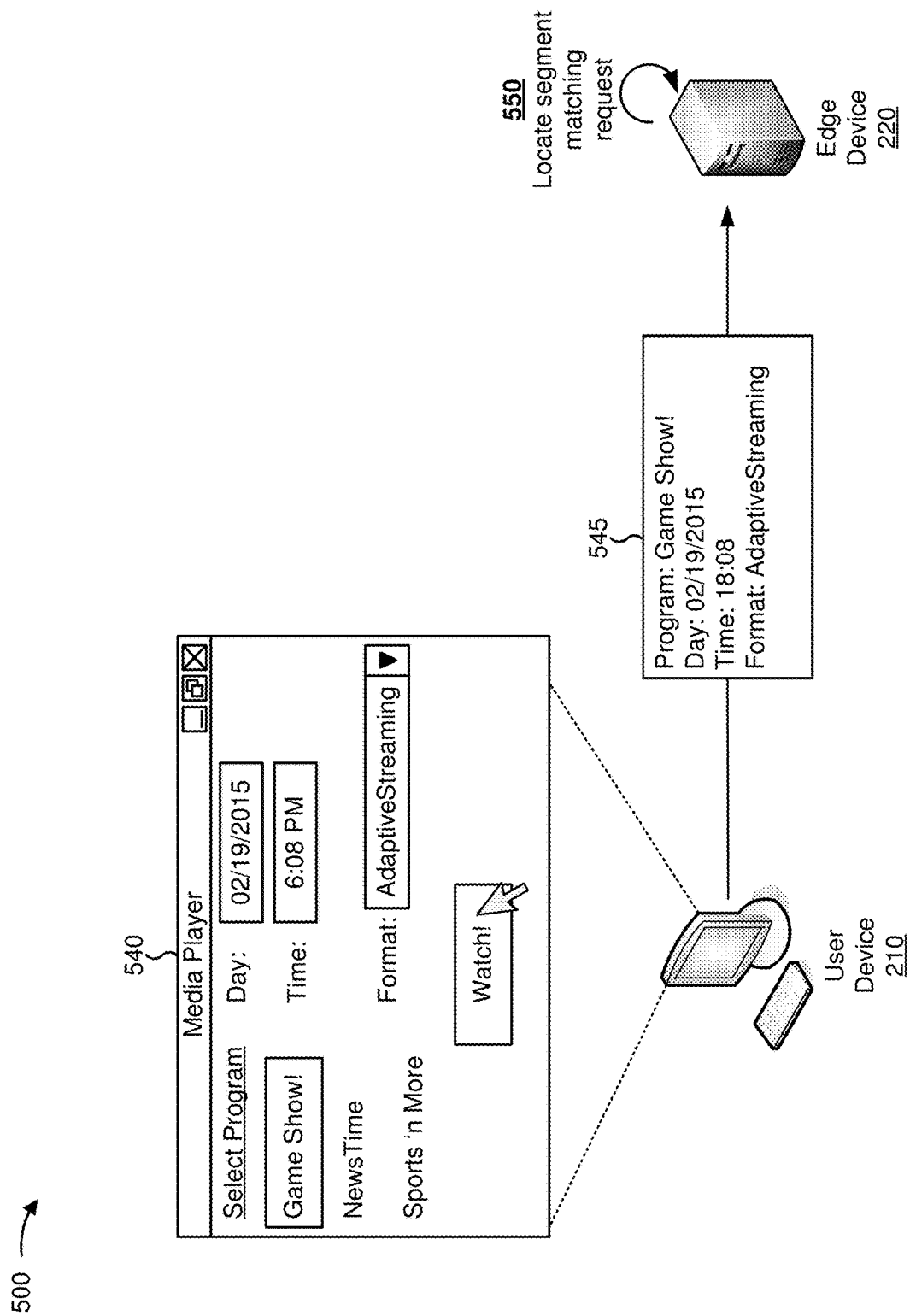

As shown in FIG. 5C, and by reference number 540, user device 210 provides a user interface with which a user selects the game show content for playback. The user also indicates contextual information, such as a date and time at which the game show content was broadcast and a supported streaming protocol (e.g., AdaptiveStreaming). As shown by reference number 545, based on a user interaction with a button, user device 210 may provide a request that edge device 220 provide the game show content. The request includes the contextual information. As shown by reference number 550, edge device 220 may determine to locate a segment matching the request.

Figure 5D:
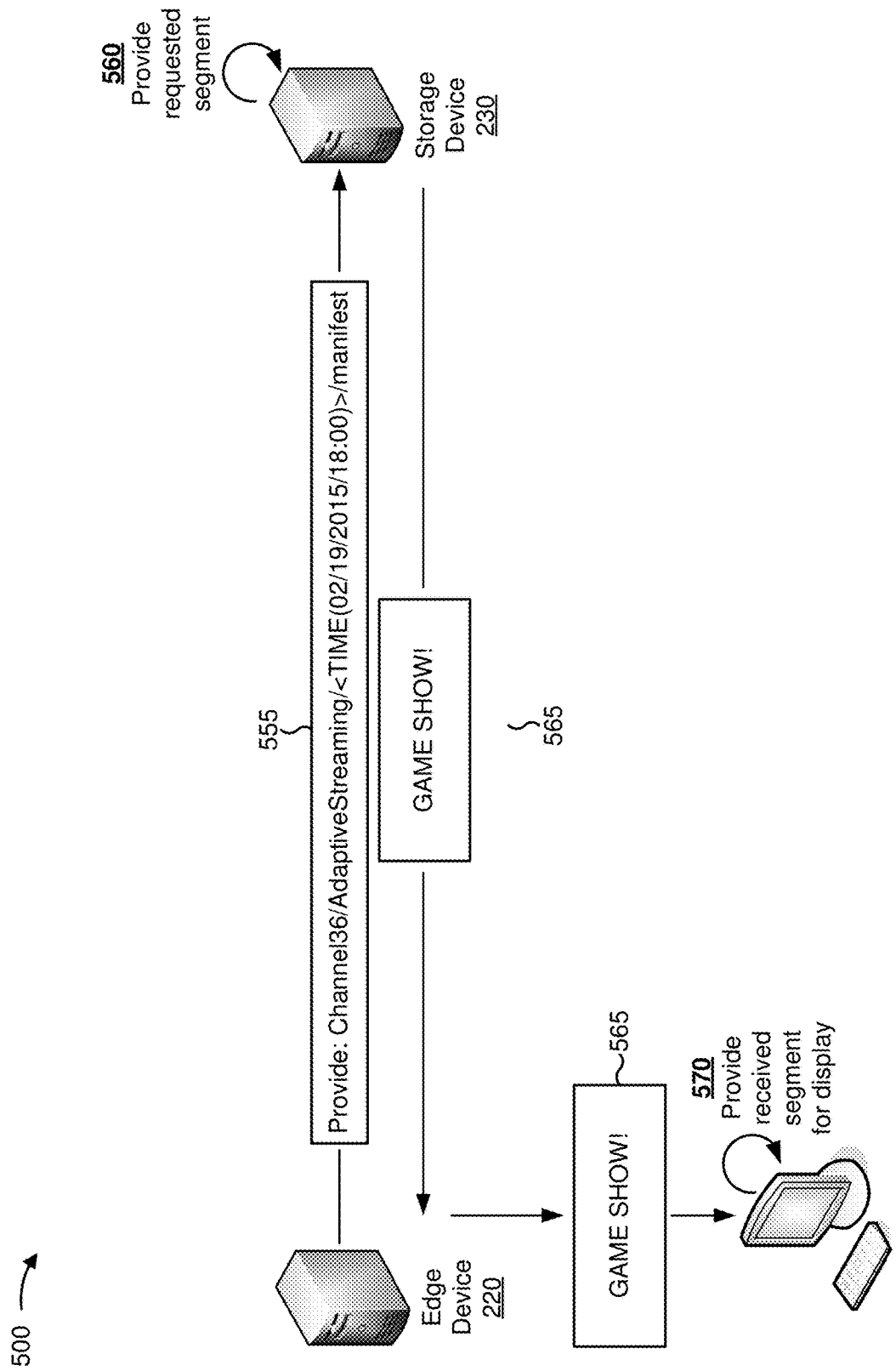

As shown in FIG. 5D, edge device 220 transmits a request for a playlist including a segment matching the request to storage device 230. As shown by reference number 555, the request includes information identifying a folder location for the playlist (e.g., the request indicates that the playlist is in a folder associated with a particular channel, a sub-folder associated with a particular streaming protocol, and a sub-sub-folder associated with the particular time interval). As shown by reference number 560, storage device 230 may provide segment 565 via edge device 220 to user device 210. As shown by reference number 570, user device 210 provides segment 565 for display (e.g., user device 210 decrypts the DRM protection from segment 565, decodes segment 565, and plays segment 565).

As indicated above, FIGS. 5A-5D are provided merely as an example. Other examples are possible and may differ from what was described with regard to FIGS. 5A-5D.

Figure 6B:
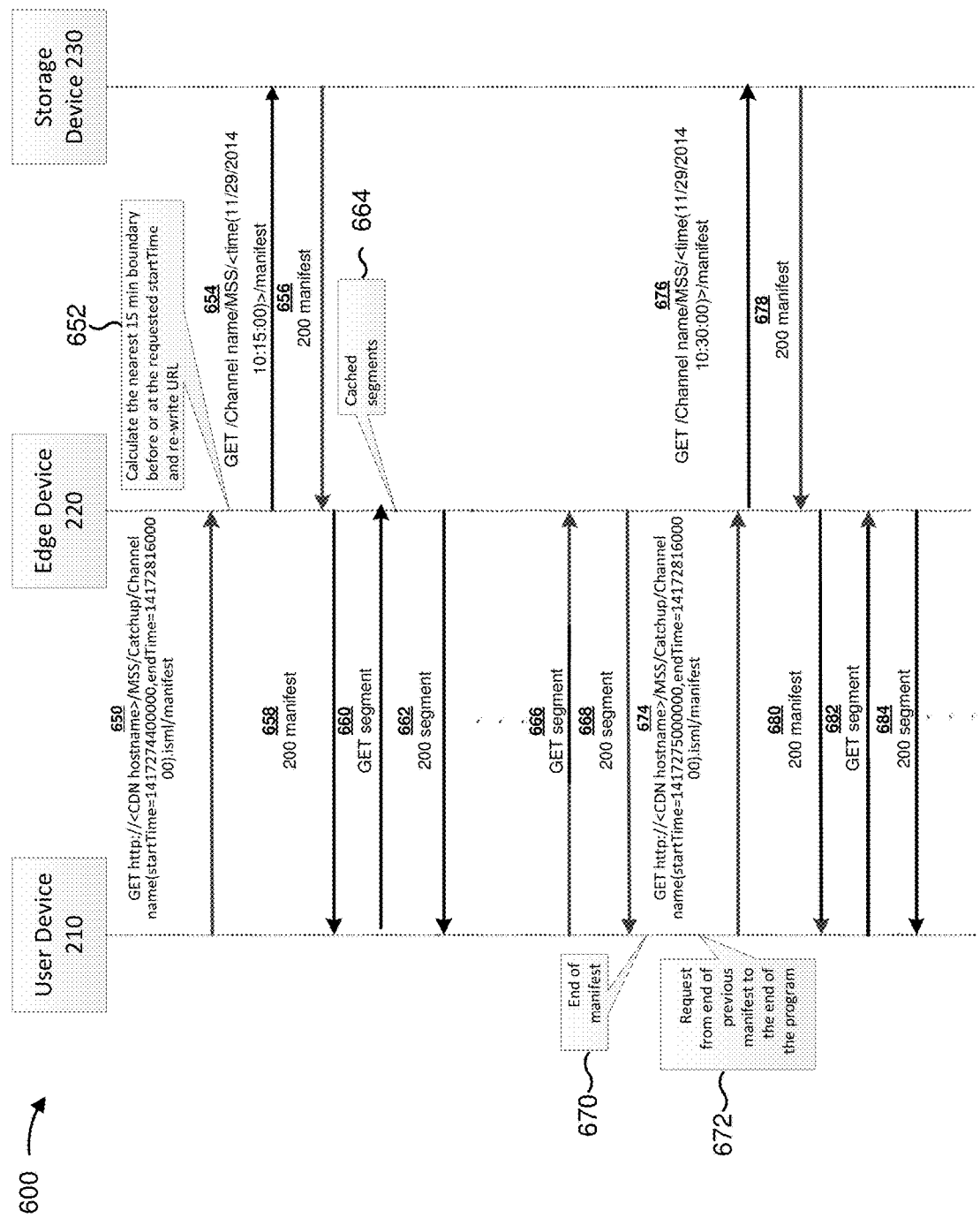

FIGS. 6A and 6B are call flow diagrams of an example process 600 for providing time-shifting for over-the-top linear streamed content. In some implementations, one or more operations of FIGS. 6A and 6B may be performed by one or more devices of environment 200.

As shown in FIG. 6A, process 600 may include requesting content, at date and time 601, from content server 250 (as shown by reference number 602). For example edge device 220 may transmit a request to a particular network address associated with content server 250. In some implementations, edge device 220 may request a playlist (e.g., a manifest file) associated with multiple segments of content.

As further shown in FIG. 6A, process 600 may include causing a folder to be created in a data structure (as shown by reference number 604). For example, edge device 220 may transmit information causing a folder to be established in a data structure associated with storage device 230 for the content requested from content server 250. In some implementations, the request may indicate a file location for the folder (e.g., a file location that is based on contextual information associated with the content).

As further shown in FIG. 6A, process 600 may include receiving playlist associated with multiple segments of content (as shown by reference number 606). For example, edge device 220 may receive, from content server 250, a manifest file that includes information identifying multiple segments of the content requested from content server 250.

As further shown in FIG. 6A, process 600 may include causing the playlist to be stored in the folder (as shown by reference number 608). For example, edge device 220 may transmit the manifest file to storage device 230 for storage in the folder in the data structure associated with storage device 230. In this way, the folder may include information identifying the segments of the content that are to be stored in the folder. As shown by reference number 610, based on receiving the manifest file and causing the manifest file to be stored in the folder, edge device 220 may request the multiple segments of the content and cause the multiple segments of the content to be stored via the folder.

As further shown in FIG. 6A, process 600 may include requesting a first segment of the content (as shown by reference number 612). For example, edge device 220 may request the first segment of the content, identified in the manifest file, from content server 250.

As further shown in FIG. 6A, process 600 may include receiving the first segment of the content (as shown by reference number 614). For example, edge device 220 may receive the first segment of the content from content server 250.

As further shown in FIG. 6A, process 600 may include causing the first segment of the content to be stored in the folder (as shown by reference number 616). For example, edge device 220 may transmit the first segment of the content to storage device 230 for storage in the folder of the data structure associated with storage device 230. In some implementations, edge device 220 may include information identifying the folder into which the first segment is to be stored when transmitting the first segment of the content to storage device 230.

As further shown in FIG. 6A, process 600 may include requesting other segments of the content, receiving the other segments of the content, and causing the other segments of the content to be stored in the folder based on the manifest file identifying the other segments of the content (as shown by reference numbers 618-622). In this way, edge device 220 may obtain content from content server 250 and cause the content to be stored via storage device 230.

As shown in FIG. 6B, process 600 may include receiving a request for the content (as shown by reference number 650). For example, edge device 220 may receive a request from user device 210 for the content. In some implementations, the request may identify a start time, an end time, a channel name (e.g., a channel associated the content and content server 250), and/or other contextual information. As shown by reference number 652, edge device 220 may determine a boundary of a time interval associated with the requested start time. For example, when segments of the content are associated with 15 minute increments, edge device 220 may identify a closest particular 15 minute increment before or at the requested start time (e.g., edge device 220 determines the segment that includes the content at the start time).

As further shown in FIG. 6B, process 600 may include requesting a playlist (e.g., a manifest file) for the content (as shown by reference number 654). For example, edge device 220 may request the manifest file from storage device 230. In some implementations, edge device 220 may provide contextual information associated with locating the manifest file in the data structure associated with storage device 230 (e.g., in the folder where the manifest file was stored, as described in FIG. 6A). For example, edge device 220 may, based on identifying the closest 15 minute increment, provide information identifying the closest 15 minute increment to storage device 230. The requested manifest file may be selected based on identifying the closest particular 15 minute interval and selecting a manifest file that includes a segment corresponding to the closest particular interval. Assume that edge device 220 requests, with the manifest file, the segments of the content be provided to edge device 220 for storage via a cache.

As further shown in FIG. 6B, process 600 may include receiving the manifest file (as shown by reference number 656). For example, edge device 220 may receive the manifest file from storage device 230. Assume that edge device 220 receives the segments of the content with the manifest file and stores the segments of the content in a cache associated with edge device 220.

As further shown in FIG. 6B, process 600 may include providing the manifest file to user device 210. For example, edge device 220 may provide the manifest file to user device 210.

As further shown in FIG. 6B, process 600 may include receiving a request for one or more segments of the content and providing the one or more segments of the content (as shown by reference numbers 660, 662, 666, and 668). For example, edge device 220 may receive a request from user device 210 for segments of the content, and edge device 220 may provide user device 210 with cached segments 664 (e.g., the segments of the content received from storage device 230). User device 210 requests the segments as the segments are played via a player application of user device 210, thereby maintaining playback of the content. As shown by reference number 670, user device 210 may determine that there are no more segments, identified in the manifest file, for playback, and as shown by reference number 672, user device 210 may request another manifest representing additional segments of the program.

As further shown in FIG. 6B, process 600 may include receiving a request for other manifest (as shown by reference number 674). For example, edge device 220 may receive the request for the other manifest file from user device 210. Edge device 220 may identify a start time and an end time from the request for the other manifest file and determine a set of additional segments of the content that are associated with the start time and the end time.

As further shown in FIG. 6B, process 600 may include requesting the other manifest file (as shown by reference number 676). For example, edge device 220 may request the other manifest file that is associated with the additional segments of the content from storage device 230. Assume that edge device 220 requests that the additional segments of the content, identified by the other manifest file, are provided with the other manifest file for storage via a cache associated with edge device 220.

As further shown in FIG. 6B, process 600 may include receiving the other manifest file (as shown by reference number 678). For example, edge device 220 may receive the other manifest file from storage device 230. Assume that edge device 220 receives the additional segments of the content and stores the additional segments of the content via the cache associated with edge device 220.

As further shown in FIG. 6B, process 600 may include providing the other manifest file (as shown by reference number 680). For example, edge device 220 may provide the other manifest file to user device 210.

As further shown in FIG. 6B, process 600 may include receiving a request for segments, of the additional segments, and providing the segments of the additional segments (as shown by reference numbers 682 and 684). For example, based on user device 210 requesting the additional segments identified by the other manifest file, edge device 220 may provide the additional segments to user device 210 for playback.

Although FIGS. 6A and 6B shows example operations of process 600, in some implementations, process 600 may include additional operations, fewer operations, different operations, or differently arranged operations than those depicted in FIGS. 6A and 6B. Additionally, or alternatively, two or more of the operations of process 600 may be performed in parallel.

In this way, edge device 220 of CDN 240 may provide content while maintaining multiple versions of the content and without altering the DRM protection on the content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors; and
a memory storing instructions that, when executed by the one or more processors, cause the one or more processors to:
   receive a plurality of versions of content from one or more data streams associated with a content provider,
      the content including at least one of audio content or video content;
   cause the plurality of versions of the content to be stored via a data structure,
      a first segment of a first version of the content, of the plurality of versions of the content, and a second segment of a second version of the content, of the plurality of versions of the content, being stored in a first folder associated with the data structure without removing digital rights management (DRM) protection associated with the content,
      the first segment and the second segment corresponding to a first time interval,
      the first version of the content being associated with a first DRM encryption scheme,
      the first version of the content being associated with a first streaming protocol,
      the second version of the content being associated with a second DRM encryption scheme, and
      the second version of the content being associated with a second streaming protocol,
      a third segment of the first version of the content and a fourth segment of the second version of the content being stored in a second folder associated with the data structure without removing the DRM protection associated with the content,
      the third segment and the fourth segment corresponding to a second time interval, and
      the data structure being organized based on a DRM encryption scheme and a streaming protocol of each of the plurality of versions of the content;
   receive a request for the content from a user device;
   select the first version of the content or the second version of the content based on the request for the content, a quality of a network connection associated with the user device, the first version of the content having a first resolution, and the second version of the content having a second resolution;
   locate the first folder or the second folder based on a time interval associated with the request; and
   selectively:
      provide the first segment for playback of at least one of the audio content or the video content based on the first version of the content being selected and the first time interval being associated with the request,
      provide the second segment for playback of at least one of the audio content or the video content based on the second version of the content being selected and the first time interval being associated with the request,
      provide the third segment for playback of at least one of the audio content or the video content based on the first version of the content being selected and the second time interval being associated with the request, or
      provide the fourth segment for playback of at least one of the audio content or the video content based on the second version of the content being selected and the second time interval being associated with the request.

2. The device of claim 1, where the one or more processors, when receiving the plurality of versions of the content, are to:
receive the plurality of versions of the content via an over-the-top linear channel stream.

3. The device of claim 1, where the data structure is further organized based on at least one of:
a time-stamp for the content,
a time interval for the content,
a bitrate associated with the content,
a content source associated with the content.

4. The device of claim 1, where the one or more processors are further to:
generate a playlist for a set of at least one of audio files or video files,
the set of at least one of audio files or video files including the first segment, the second segment, the third segment, or the fourth segment; and
where the one or more processors, when selectively providing the first segment, the second segment, the third segment, or the fourth segment are to:
provide the playlist.

5. The device of claim 1, where the one or more processors are further to:
determine that a particular period of time has elapsed from receiving the plurality of versions of the content; and
cause the plurality of versions of the content to be removed from the data structure based on determining that the particular period of time has elapsed.

6. The device of claim 1, where the one or more processors are further to:
determine a time-stamp associated with playback based on the request for the content; and
cause the content to be provided for playback at the time-stamp.

7. The device of claim 1,
where the one or more processors are further to:
cause the DRM protection to be removed from the first version of the content after providing the first version of the content, or
cause the DRM protection to be removed from the second version of the content after providing the second version of the content.

8. A method, comprising:
receiving, by a device, a plurality of versions of content via an over-the-top (OTT) linear channel stream;
causing, by the device, the plurality of versions of the content to be stored via a data structure,
a first segment of a first version of the content, of the plurality of versions of the content, and a second segment of a second version of the content, of the plurality of versions of the content, being stored in a first folder associated with the data structure without removing digital rights management (DRM) protection associated with the content,
the first segment and the second segment corresponding to a first time interval,
the first version of the content being associated with a first DRM encryption scheme,
the first version of the content being associated with a first streaming protocol,
the second version of the content being associated with a second DRM encryption scheme, and the second version of the content being associated with a second streaming protocol,
a third segment of the first version of the content and a fourth segment of the second version of the content being stored in a second folder associated with the data structure without removing the DRM protection associated with the content,
the third segment and the fourth segment corresponding to a second time interval,
the data structure storing a set of content received via a set of OTT linear channel streams, and
the data structure being organized based on a DRM encryption scheme and a streaming protocol of each of the plurality of versions of the content;
receiving, by the device and from a user device, a request for the content;
selecting, by the device, the first version of the content or the second version of the content based on the request for the content, a quality of a network connection associated with the user device, the first version of the content having a first resolution, and the second version of the content having a second resolution;
selectively locating, by the device, the first folder or the second folder based on a time interval associated with the request; and
selectively:
providing, by the device and to a playback device, the first segment for playback based on the first version of the of the content being selected and the first time interval being associated with the request,
providing, by the device and to the playback device, the second segment for playback based on the second version of the content being selected and the first time interval being associated with the request,
providing, by the device and to the playback device, the third segment for playback based on the first version of the content being selected and the second time interval being associated with the request, or
providing, by the device and to the playback device, the fourth segment for playback based on the second version of the content being selected and the second time interval being associated with the request.

9. The method of claim 8, where the data structure is further organized based on information identifying at least one of:
a resolution for the content,
a time interval for the content, or a format for the content.

10. The method of claim 8, where causing the plurality of versions of the content to be stored via the data structure comprises:
causing the plurality of versions of the content to be stored in a particular location based on the organization of the data structure.

11. The method of claim 8, further comprising:
receiving an indication of a time-stamp for the content;
determining that the first time interval includes the time-stamp; and
selecting the first segment based on determining that the first time interval includes the time-stamp; and
where selectively locating the first folder comprises:
locating the first folder based on selecting the first segment.

12. The method of claim 8, where the data structure is associated with a content delivery network (CDN),
the CDN including a plurality of CDN edge devices,
the plurality of CDN edge devices including the device, a CDN edge device, of the plurality of CDN edge devices, being associated with storing and locating information via the data structure.

13. The method of claim 8, where the method further comprises:
causing the DRM protection to be removed from:
the first segment after providing the first segment,
the second segment after providing the second segment,
the third segment after providing the third segment, or
the fourth segment after providing the fourth segment.

14. A computer-readable medium storing instructions, the instructions comprising:
one or more instructions that, when executed by one or more processors, cause the one or more processors to:
receive a plurality of versions of content from one or more data streams associated with a content provider,
the content including at least one of audio content or video content;
cause the plurality of versions of the content to be stored via a data structure,
a first segment of a first version of the content, of the plurality of versions of the content, and a second segment of a second version of the content, of the plurality of versions of the content, being stored in a first folder associated with the data structure without removing digital rights management (DRM) protection associated with the content,
the first segment and the second segment corresponding to a first time interval,
the first version of the content being associated with a first DRM encryption scheme,
the first version of the content being associated with a first streaming protocol,
the second version of the content being associated with a second DRM encryption scheme, and
the second version of the content being associated with a second streaming protocol,
a third segment of the first version of the content and a fourth segment of the second version of the content being stored in a second folder associated with the data structure without removing the DRM protection associated with the content,
the third segment and the fourth segment corresponding to a second time interval, and
the data structure being organized based on a DRM encryption scheme and a streaming protocol of each of the plurality of versions of the content;
receive a request for the content from a user device;
select the first version of the content or the second version of the content based on the request for the content, a quality of a network connection associated with the user device, the first version of the content having a first resolution, and the second version of the content having a second resolution;
locate the first folder or the second folder based on a time interval associated with the request for content; and
selectively:
provide the first segment for playback of at least one of the audio content or the video content based on the first version of the content being selected and the first time interval being associated with the request,
provide the second segment for playback of at least one of the audio content or the video content based on the second version of the content being selected and the first time interval being associated with the request,
provide the third segment for playback of at least one of the audio content or the video content based on the first version of the content being selected and the second time interval being associated with the request, or
provide the fourth segment for playback of at least one of the audio content or the video content based on the second version of the content being selected and the second time interval being associated with the request.

15. The computer-readable medium of claim 14, where the one or more instructions, that cause the one or more processors to receive the plurality of versions of the content, cause the one or more processors to:
receive the plurality of versions of the content via an over-the-top linear channel stream.

16. The computer-readable medium of claim 14, where the one or more instructions, when executed by the one or more processors, further cause the one or more processors to:
provide information identifying the plurality of versions of the content; and
receive the request based on providing the information identifying the plurality of versions of the content.

17. The computer-readable medium of claim 14, where the one or more instructions, when executed by the one or more processors, further cause the one or more processors to:
generate a playlist for a set of at least one of audio files or video files,
the set of at least one of audio files or video files including the first segment, the second segment, the third segment, or the fourth segment; and
where the one or more instructions, that cause the one or more processors to selectively provide the first segment, the second segment, the third segment, or the fourth segment, cause the one or more processors to:
provide the playlist.

18. The computer-readable medium of claim 14, where the one or more instructions, when executed by the one or more processors, further cause the one or more processors to:
determine that a particular period of time has elapsed from receiving the plurality of versions of the content; and
cause the plurality of versions of the content to be removed from the data structure based on determining that the particular period of time has elapsed.

19. The computer-readable medium of claim 14, where the one or more instructions, when executed by the one or more processors, further cause the one or more processors to:
receive information associated with authenticating a user to access the content; and
where the one or more instructions, that cause the one or more processors to selectively provide the first segment, the second segment, the third segment, or the fourth segment, cause the one or more processors to:
selectively provide the first segment, the second segment, the third segment, or the fourth segment based on receiving the information associated with authenticating the user to access the content.

20. The computer-readable medium of claim 14,
where the one or more instructions, when executed by the one or more processors, further cause the one or more processors to:
cause the DRM protection to be removed from the first version of the content after providing the first version of the content, or
cause the DRM protection to be removed from the second version of the content after providing the second version of the content.

\* \* \* \* \*